G. H. BENJAMIN.
DEHYDRATING APPARATUS.
APPLICATION FILED AUG. 1, 1914.
1,220,815.
Patented Mar. 27, 1917.
3 SHEETS—SHEET 1.
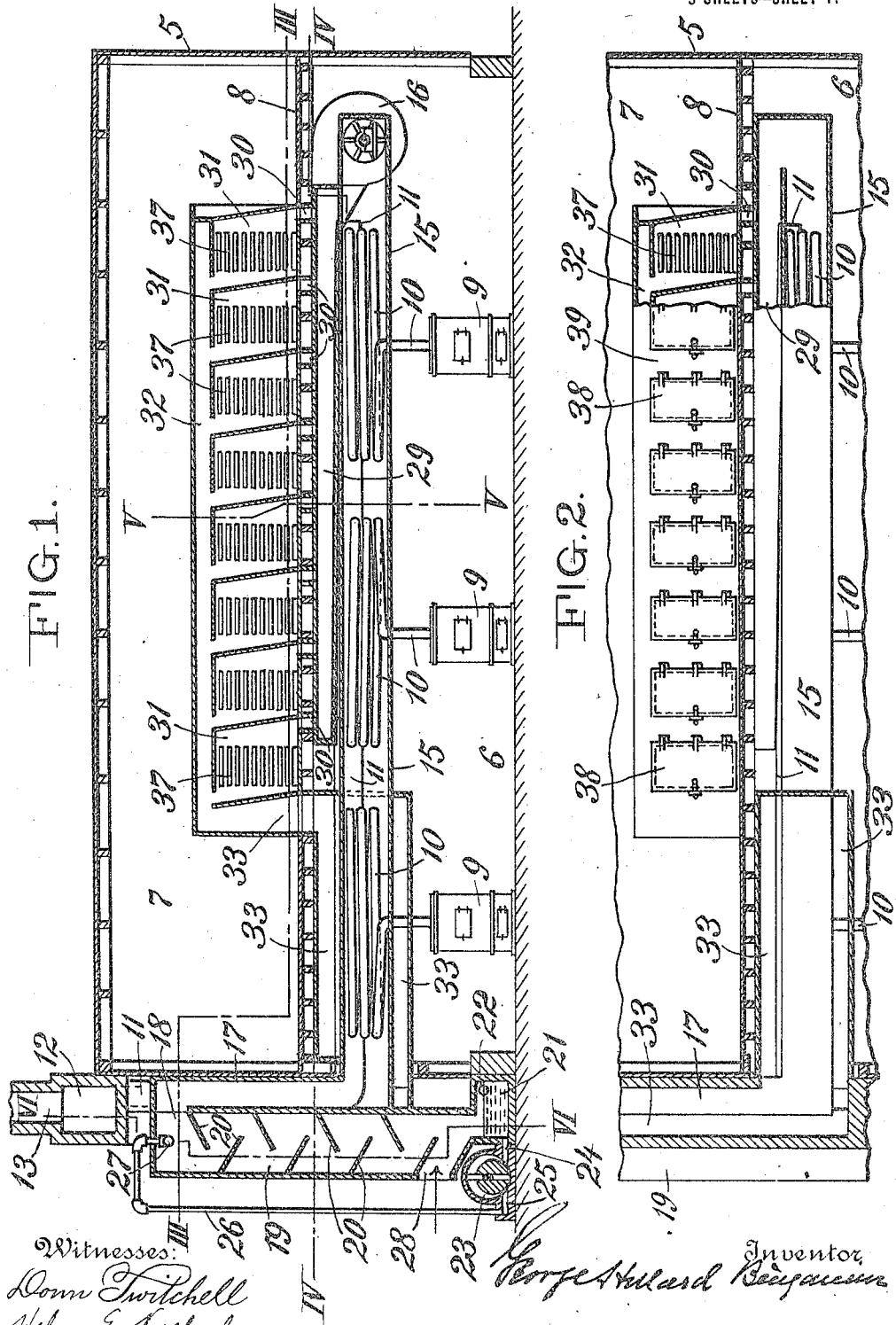

G. H. BENJAMIN.
DEHYDRATING APPARATUS.
APPLICATION FILED AUG. 1, 1914.

1,220,815.

Patented Mar. 27, 1917.
3 SHEETS—SHEET 2.

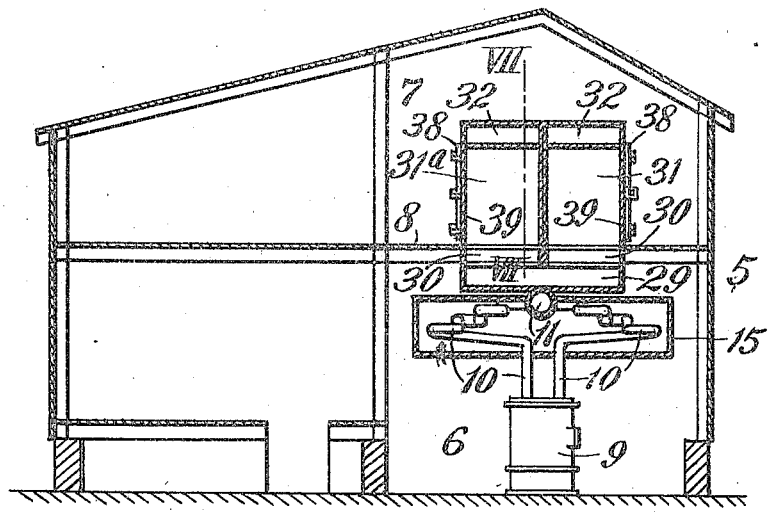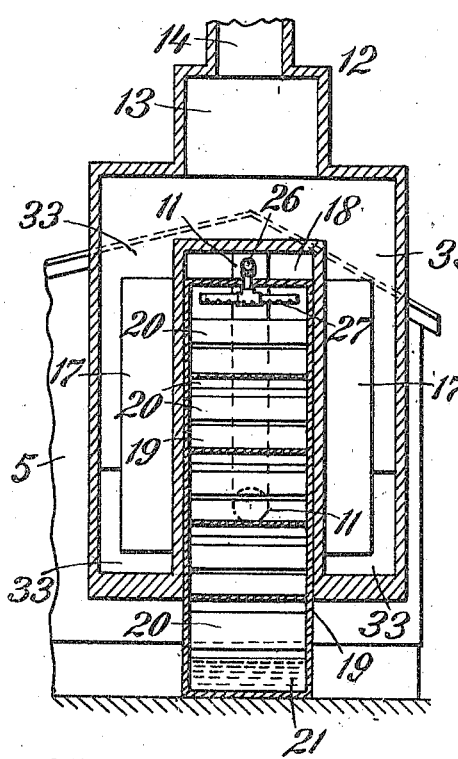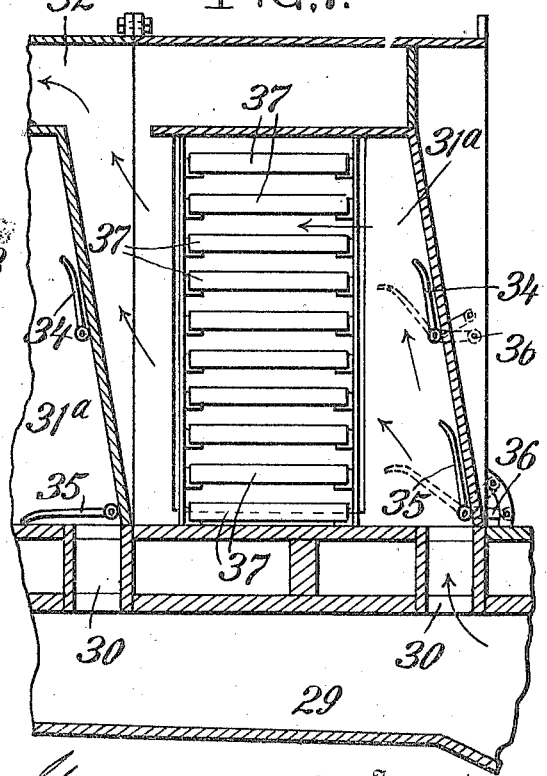

UNITED STATES PATENT OFFICE.

GEORGE HILLARD BENJAMIN, OF NEW YORK, N. Y.

DEHYDRATING APPARATUS.

1,220,815.   Specification of Letters Patent.   Patented Mar. 27, 1917.

Application filed August 1, 1914. Serial No. 854,597.

*To all whom it may concern:*

Be it known that I, GEORGE HILLARD BENJAMIN, a citizen of the United States, residing at New York, in the county and State of New York, have invented certain new and useful Improvements in Dehydrating Apparatus, of which the following is a specification.

My invention consists in an apparatus for dehydrating fruits and vegetables and other materials, normally containing or to which water has been added.

The object of my invention is an apparatus in which cheap and efficient means is provided for primarily removing a certain portion of the water contained in the air used for dehydrating; apparatus for heating air to the required temperature; apparatus for conveying the heated dehydrating air to and through the materials to be dehydrated and out of the dehydrating apparatus.

My invention has in view the utilization of the building and a portion of the apparatus as now commonly employed in the dehydrating of fruits and vegetables, and the utilization of further apparatus by reason of which the combined old and new apparatus will produce a cheaper and more effective dehydration than has heretofore been possible.

Figure 3:
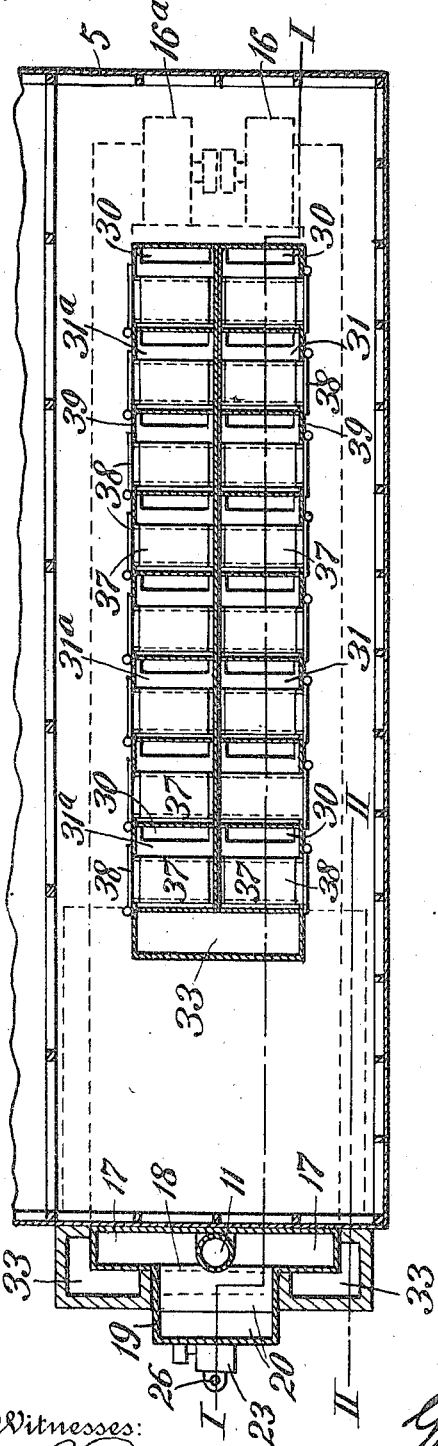
Figure 4:
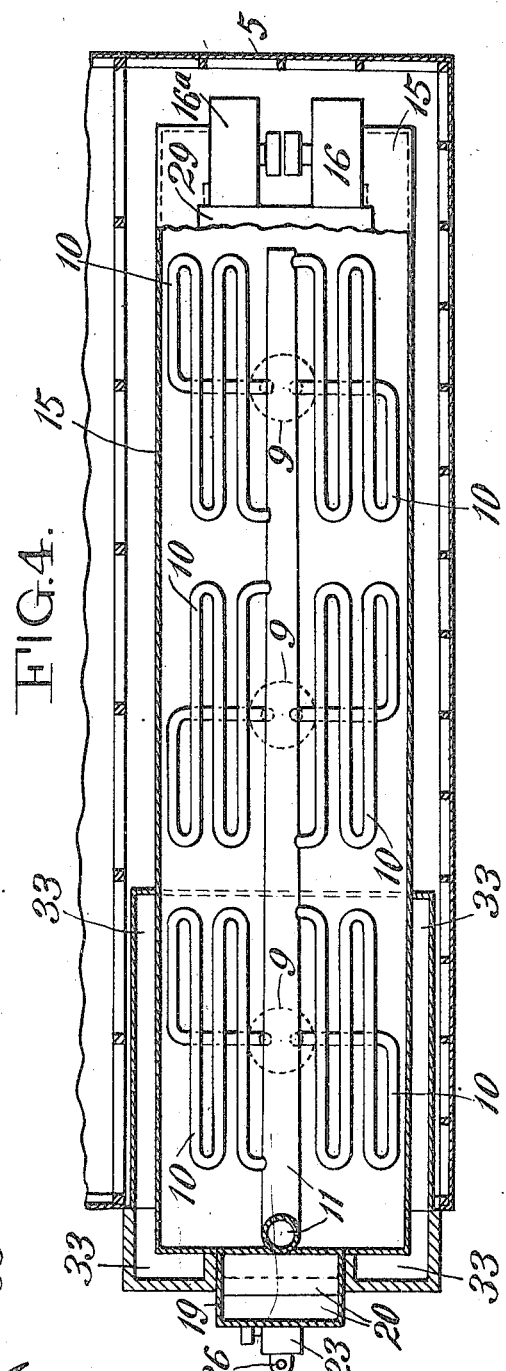

The accompanying drawings will serve to illustrate my invention, in which Figure 1 is a vertical section through a building containing my improved dehydrating apparatus, also showing a portion of the apparatus in vertical section and a portion in elevation, this section being taken on the line I—I of Fig. 3. Fig. 2 is a side elevation and partial section on the line II—II of Fig. 3, the portion at the right of the figure showing a modified construction. Fig. 3 is a horizontal section taken on the line III—III of Fig. 1. Fig. 4 is a plan and partial section taken on the line IV—IV of Fig. 1. Fig. 5 is a vertical section, the part at the right taken on the line V—V of Fig. 1. Fig. 6 is a vertical section taken from the right on the line VI—VI of Fig. 1. Fig. 7 is a vertical section of one of a series of adjoining cells and damper apparatus, taken on the line VII—VII of Fig. 5.

In the drawings, 5 represents a building such as is commonly employed for the dehydration of fruits and vegetables. The general configuration of this building is shown in outline in Fig. 5. The building is divided into two stories, 6 and 7, separated by a floor 8. Located in the first story 6 is a series of furnaces 9. Leading from these furnaces are pipes 10 arranged as shown, and connected to a flue 11, which flue is in turn connected to a chimney stack 12. The chimney stack is preferably arranged with two diameters, 13—14, the larger diameter being at the bottom, the object of which arrangement is to maintain a constant velocity of the gases passing through the chimney stack, in a manner well understood. The pipes 10 are inclosed in a casing 15, which is connected at the right end to the induction opening of a blower 16. The left hand end of this casing is connected to a vertical pipe 17, which communicates through a horizontal pipe 18 with the top of the dehydrator 19.

The dehydrator 19 as shown in Fig. 3, is rectangular in cross section, and is provided with a series of inclined plates 20 projecting from opposite sides and arranged to overlap. The bottom of the dehydrator 19 communicates with a well or water receptacle 21, provided with an overflow 22. Situated in front of the well or water receptacle, is a pump 23 having its induction orifice 24 communicating with the water receptacle 21, and its eduction orifice 25 communicating with a pipe 26 carried into the top of the casing and provided with a sprinkler 27. In the bottom of the outside wall of the dehydrator 19 is an opening 28.

Assuming now the material in the well or water receptacle 21 to be brine, it will be understood that the pump 23 draws the brine from the receptacle and delivers it through the pipe 26 to the top of the dehydrator 19, from which it flows down the plates 20 to the well 21, to be again circulated. The air enters the opening 28 and passes up through the dehydrator 19 to the horizontal pipe 18, thence down the vertical pipe 17 to the casing 15, and thence to the induction orifice 24 of the air pump 16. The purpose of the dehydrator is to remove a certain portion of the moisture of the incoming air. This is done by absorption; the air passing over the brine, gives up a certain portion of its water to the brine. Arrangements can be made to evaporate a portion of the water contents of the brine, as water is absorbed, thus keeping the brine at constant strength.

I wish it understood that the arrangement for dehydrating the air as shown in the drawings, is merely diagrammatic, and intended only to illustrate an apparatus which shall make use of brine as the absorbing medium. The particular arrangement of the plates 20 may differ, or otherwise, be in accordance with well known practice.

29 represents a casing connected to the eduction opening of the blower 16 at its right hand end, and through passages 30 to a series of sectional cells 31, to be discharged into a casing 32, arranged over the cells. The casing 32 connects at its left hand end to a casing 33, connected at its upper end to the chimney stack 12.

I have described the casing 29 as a single casing connected to a single pump and to a series of cells 31. In Fig. 3 two pumps are shown, 16 and 16ª, and two series of cells 31 and 31ª, the two series of cells 31 and 31ª being connected to the casing 33. I prefer this arrangement as by having two pumps and two series of cells, in case of accident to either pump, the other pump can be used, or both pumps can be used together, or both pumps can be used on a number of cells less than the whole number. For controlling the air through the cells, I provide valves 34—35, which may be operated from the outside of the cells by handles, as indicated at 36.

In Fig. 7, when the valves are in the position shown in full lines, the air entering by the passages 30, passes upward through the upper portion of the cells and out through the casing 32. When the valves are in the position shown in dotted lines, the air passes through the lower part of the cells. When the valve 35 is in the position shown in the left of the figure, this cell is cut out.

Located within the cells are a series of trays 37 which may be withdrawn from the apparatus through doors 38 in the inclosing casing 39, as shown in Fig. 2. The valves 34—35 are adapted, as before stated, to be moved by hand. If desired, these valves can be moved mechanically by automatic apparatus to give them constant movement, so as to vary at intervals, the direction of the incoming air through the cells. I have not disclosed in this application, such mechanical device as the same has been described in an application filed simultaneously herewith, Serial No. 854,598 filed August 1st, 1914.

The general operation of my improved apparatus is as follows: Air entering through the opening 28 of the dehydrator, parts with the major portion of its moisture to the brine, flowing down the plates 20. It then passes through the casing 15, where it is heated by the heat radiated from the pipes 10; it then enters the induction orifice of the blower 16, and is driven through the cells 31, picking up in its passage, moisture from the articles to be dehydrated, to be finally carried out through the casing 32 and chimney stack 12.

In practice I prefer that the temperature of the air passing through the cells shall not exceed 160° Fahrenheit, as I have found that this temperature is sufficient to produce osmotic extraction of the fluids contained within the cell walls of the materials acted upon, without in any wise rupturing the cell walls or producing any chemical change either in the cell walls or in the materials, and further, I find this temperature desirable in that it does not produce a total extraction of the contained moisture, but leaves sufficient moisture to maintain the cell walls or the structure of the body in a condition to allow endosmosis to take place when the article dried is subjected at some subsequent period to the action of hot water.

A series of experiments have demonstrated that when the moisture contents of a body is reduced 20% of its normal contents, enzyms will not develop, and there will be no fermentation; and further, that when the moisture contents is reduced to 5%, there will be no formation of mold, and the body will be in a condition to endosmotically absorb water when subsequently treated with water, and further, that if the entire water contents is extracted, no subsequent endosmotic action will take place.

I wish it understood that by the word "dehydration" in this specification, I mean a method of treatment by reason of which all of the water normally contained in the body treated will be removed, with the exception of approximately 5%, and which body is capable of endosmotically reabsorbing water when subsequently subjected to the action of water, as distinguished from desiccation, wherein all of the water is removed and the body incapable of endosmotically absorbing water.

In making use of the apparatus described, I prefer in some cases, to heat the body which is to be dehydrated, to a temperature of 160° before osmotically extracting any of the contained water. To accomplish this the hot air follows the same course as has heretofore been described, but at such time the brine circulation over the plates is stopped.

In this specification I have stated the temperature to be used for the heating of the materials to be dehydrated and for the dehydrated air at approximately 160° Fahrenheit. This temperature is the one I find to be most generally useful, but I wish it understood that I do not limit myself to such temperature as there are various bodies which may be heated above 160° Fahrenheit without the destruction of their physical structure, volatilization of any contained bodies, or effecting chemical change.

It will be observed that the air currents in the structure disclosed in this application, flow in at the bottom of the cells, across the cells and out of the cells. I prefer this arrangement for the air currents, rather than an arrangement where the air enters the top of the cells, across the cells and out of the bottom, for the reason that the air as it absorbs moisture becomes lighter and the movement of the air through the cells is facilitated. I make no claim broadly for an apparatus for absorbing moisture from air through circulating brine, my invention being limited to the employment of water absorbing apparatus in connection with the other elements specified in the claims.

Having thus described my invention, I claim:

1. In a dehydrating apparatus, the combination of air dehydrating means consisting of a chamber having an opening in the lower end, means for circulating brine through said chamber, a casing connected at one end to the upper end of said chamber and at the other end to the dehydrator, means in said chamber for imparting heat to air passing through said chamber, an air pump, a series of sectional cells, means for projecting the heated air from the pump upward and through said cells, a chimney stack, and means for conveying the air from the cells to the chimney stack.

2. In a dehydrating apparatus, the combination of means for dehydrating air, a horizontally disposed casing communicating at one end with said dehydrating means, an air pump connected to the other end of said casing, heating apparatus for the air in said casing, a series of cells, a casing communicating at one end with the delivery end of the pump and communicating along its length with the individual cells, a chimney stack, and a casing arranged over the top of the cells and communicating with each cell and the chimney stack.

3. In a dehydrating apparatus, the combination of means for dehydrating air, a horizontally disposed casing communicating at one end with said dehydrating means, an air pump connected to the other end of said casing, heating apparatus for the air in said casing, said heating apparatus comprising pipes connected at one end to a heater and at the other end to a chimney stack through which the heated products are conveyed from the heater to the chimney stack, a series of cells, a casing communicating at one end with the delivery end of the pump and communicating along its length with the individual cells, a chimney stack, and a casing arranged over the top of the cells and communicating with each cell and the chimney stack.

4. In a dehydrating apparatus, the combination of means for dehydrating air, a horizontally disposed casing communicating at one end with said dehydrating means, an air pump connected to the other end of said casing, heating apparatus for the air in said casing, a series of cells, and a casing communicating at one end with the delivery end of the pump and communicating along its length with the individual cells.

5. In a dehydrating apparatus, the combination of means for dehydrating air, a horizontally disposed casing communicating at one end with said dehydrating means, heating apparatus for the air in said casing, a series of cells, a second casing communicating at one end with the first casing and throughout its length with the individual cells, and means for causing a current of air to flow through said dehydrating means, casings and cells.

6. In a dehydrating apparatus, the combination of means for dehydrating air, a series of drying cells, a horizontally disposed casing extending under said cells and communicating along its length therewith, an air pump having its delivery end connected to one end of said casing, a second casing disposed under the first casing and communicating at one end with the intake end of the pump, the other end of said casing being in communication with the said air dehydrating means, and heating coils extending substantially throughout the length of the second casing.

7. In a dehydrating apparatus, in combination, a horizontally disposed casing, air heating means therein, a series of air cells, a second casing communicating at one end with one end of said casing and along its length with said cells, a vertically disposed casing adjacent and communicating with the other end of said first casing, means for circulating brine through said last mentioned casing, and means for causing a current of air to flow first through said vertical casing in intimate contact with the circulating brine and then through the casing containing the heating means and finally through the other casing and the cells.

In testimony whereof, I affix my signature, in the presence of two witnesses.

GEORGE HILLARD BENJAMIN.

Witnesses:
HELEN E. KOELSCH,
LESTER BEARDSLEY.